US008325753B1

(12) United States Patent
Bharghavan et al.

(10) Patent No.: US 8,325,753 B1
(45) Date of Patent: Dec. 4, 2012

(54) SELECTIVE SUPPRESSION OF 802.11 ACK FRAMES

(75) Inventors: Vaduvur Bharghavan, Morgan Hill, CA (US); Vinay Sagar, Mysore (IN); Mohan Ram, Bangalore (IN)

(73) Assignee: Meru Networks, Sunnyvale, CA (US)

( * ) Notice: Subject to any disclaimer, the term of this patent is extended or adjusted under 35 U.S.C. 154(b) by 1142 days.

(21) Appl. No.: 12/194,289

(22) Filed: Aug. 19, 2008

Related U.S. Application Data

(60) Provisional application No. 61/060,368, filed on Jun. 10, 2008.

(51) Int. Cl.
*H04L 12/28* (2006.01)
(52) U.S. Cl. ..................................................... 370/431
(58) Field of Classification Search .................. None
See application file for complete search history.

(56) References Cited

U.S. PATENT DOCUMENTS

| | | | |
|---|---|---|---|
| 5,038,151 A | 8/1991 | Kaminski | |
| 5,337,397 A | 8/1994 | Lebby et al. | |
| 5,966,094 A | 10/1999 | Ward et al. | |
| 6,658,047 B1 | 12/2003 | Komulainen et al. | |
| 6,760,318 B1 | 7/2004 | Bims | |
| 6,788,658 B1 | 9/2004 | Bims | |
| 6,839,038 B2 | 1/2005 | Weinstein | |
| 6,894,649 B2 | 5/2005 | Ostervall | |
| 6,914,907 B1 * | 7/2005 | Bhardwaj et al. | 370/432 |
| 6,933,909 B2 | 8/2005 | Theobold | |
| 6,954,177 B2 | 10/2005 | Channabasappa et al. | |
| 6,978,158 B2 | 12/2005 | Ghavami | |
| 7,319,685 B2 | 1/2008 | Kim et al. | |
| 7,333,455 B1 | 2/2008 | Bolt et al. | |
| 7,359,362 B2 | 4/2008 | King et al. | |
| 7,453,855 B1 | 11/2008 | Madhow | |
| 7,580,393 B2 * | 8/2009 | Wang et al. | 370/332 |
| 2003/0198305 A1 | 10/2003 | Taylor et al. | |
| 2005/0111405 A1 | 5/2005 | Kanterakis | |
| 2005/0152314 A1 | 7/2005 | Sun et al. | |
| 2007/0058551 A1 * | 3/2007 | Brusotti et al. | 370/241 |
| 2007/0286077 A1 * | 12/2007 | Wu | 370/235 |
| 2007/0297391 A1 * | 12/2007 | Furukawa et al. | 370/352 |
| 2008/0080387 A1 * | 4/2008 | Wang et al. | 370/252 |

OTHER PUBLICATIONS

Habib et al "Multi-antenna techniques for OFDM based WLAN." Proceedings of First International Conference on Next-Generation Wireless Systems, Jan. 2006, pp. 186-190.

(Continued)

*Primary Examiner* — Fan Ng
(74) *Attorney, Agent, or Firm* — Law Office of Dorian Cartwright

(57) ABSTRACT

ACK messages by access points are suppressed when those access points receive messages from wireless stations for which those access points should not respond. This might occur in wireless communication systems based upon 802.11 protocols in which seamless mobility is desired, with a system controller that assigns wireless stations to specific access points. The access point examines an incoming message from a wireless device to decide whether or not to suppress a responsive ACK message to that wireless device. An access point may suppress an ACK message by suppressing the generation of the ACK, or by suppressing the transmission of a generated ACK. Mechanisms for suppressing an ACK message include setting the ACK transmission to a relatively unpowered transmitting antenna; interrupting a PHY-layer element during receipt of an incoming frame; and limiting entries in a key cache table to suppress ACK messages in response to encrypted incoming frames.

17 Claims, 3 Drawing Sheets

OTHER PUBLICATIONS

Kitahara et al. "A base station adaptive antenna for downlink transmission in a DS-CDMA system." IEEE 51st Vehicular Technology Conference Proceedings, 2000. (Abstract).

Mahler et al. "Design and optimisation of an antenna array for WiMAX base stations." IEEE/ACES International Conference on Wireless Communications and Applied Computational Electromagnetics, 2005. (Abstract).

Miaris et al. "On the base stations antenna system design for mobile communications." Electrical Engineering, 2006, pp. 157-163, vol. 88.

Miura et al. "Study of array pattern tuning method using hybrid genetic algorithms for figure-8 satellite's earth station antenna." Asia-Pacific Microwave Conference Proceedings, 2000. (Abstract).

Ponnapalli et al. "Design and packaging of antennas for wireless systems." Proceedings of Electrical Performance of Electrical Performance of Electrical Packaging, 1995. (Abstract).

Sarolic. "Base station antenna near-field radiation pattern distortion analysis." Sixth International Conference on Computational Methods for the Solution of Electrical and Electromagnetic Engineering Problems Incorporating Electromagnetic Effects on Human Beings and Equipment Seminar, 2003. (Abstract).

\* cited by examiner

SELECTIVE SUPPRESSION OF 802.11 ACK FRAMES

CROSS-REFERENCE TO RELATED APPLICATIONS

This application claims priority of the following related document:

U.S. Patent Application 61/060,368, filed Jun. 10, 2008, titled "Selective Suppression of 802.11 ACK Frames", hereby incorporated by reference as if fully set forth herein.

The following document is sometimes referred to herein as the "Incorporated Disclosure". This document forms a part of this disclosure, and is hereby incorporated by reference as if fully set forth herein:

U.S. application Ser. No. 11/715,287, filed Mar. 7, 2007, in the name of inventors Vaduvur BHARGHAVAN, Sung-Wook HAN, Joseph EPSTEIN, Berend DUNSBERGEN, and Saranavan BALASUBRAMANIAN, titled "Seamless Mobility in Wireless Networks".

As the document in the Incorporated Disclosure might itself include further document(s) incorporated by reference, those further document(s) are also incorporated by reference as if fully set forth herein.

As the document in the Incorporated Disclosure might itself include references to earlier document(s), e.g., by means of Information Disclosure or otherwise, the Examiner is encouraged and exhorted to review any such earlier references for possible relevance to this application.

BACKGROUND OF THE DESCRIPTION

In wireless communication, devices send and receive messages without being physically coupled. Wireless devices can include portable computers, telephones, location sensors (such as those using GPS), and the like. Portable computers with wireless communication capability can be coupled to a computer network, such as the Internet or the World Wide Web. The IEEE 802.11 standards (including IEEE 802.11a, IEEE 802.11b, IEEE 802.11g, and IEEE 802.11n) include known techniques for coupling wireless devices to a computer network. In the IEEE 802.11 standard, wireless devices seek out and select "access points" (herein sometimes called "AP's"). Each wireless device associates itself with a particular AP, with which it communicates. Each wireless device (which might be mobile) determines from time to time if it has good communication with its associated AP, and whether it would have better communication with a different AP.

Known wireless communication techniques exhibit several problems that interfere with seamless mobility. Handoff (deassociating a wireless device from a first AP, and associating that wireless device with a second AP) can take substantial time in relation to the wireless communication. This might constrict the wireless devices and AP's from using their full communication ability. A second problem is that each wireless device chooses the AP it associates with, based only on local state visible to the device. This might create a set of device-to-AP associations with sub-optimal usage of the wireless spectrum.

In wireless communication systems in which seamless mobility is desired, one method is to assign wireless stations to particular access points, directing only the assigned access points to respond to those wireless stations. This might be accomplished, as shown in the Incorporated Disclosure, with a control element that assigns those wireless stations to those access points. The control element thus would direct which access point(s), usually only one, respond to messages from wireless stations. One problem in the known art is that at least some access point chipsets are designed to respond to all messages from wireless stations with an ACK (acknowledgement) message, in accord with the set of IEEE 802.11 standards.

SUMMARY OF THE DESCRIPTION

The invention encompasses a set of techniques including methods, devices, and systems, providing suppression of responsive messages by access points in cases in which those access points receive messages from wireless stations for which those access points should not respond. Preferably, the responsive message to be suppressed is transmitted at the media access control (MAC) layer, such as an ACK message at the MAC layer.

One method of operating an access point according to the invention follows a protocol in which, in response to an incoming message from a wireless device, the access point sends a responsive message to that wireless device. In circumstances in which a response to the incoming message would be undesirable, the access point is caused to suppress the responsive message to that wireless device. The access point decides whether to suppress the responsive message by examining the incoming message, with the effect of identifying the wireless device that sent the incoming message, and by determining whether sending a responsive message to that wireless device would be undesirable.

In one aspect of the method for operating an access point, the access point suppresses a responsive message to a wireless device by disabling the access point's ability to send a responsive message. The method for operating an access point can suppress a responsive message such as an ACK message by causing the access point not to generate the responsive message, or by causing the access point not to transmit a generated responsive message, e.g., by substantially disabling the access point's ability to send that responsive message. In a first embodiment of disabling the access point's ability to send a responsive message, the access point sets a transmitting antenna from the access point to a relatively unpowered antenna for the duration of the responsive message to be sent by the access point. In a second embodiment of disabling the access point's ability to send a responsive message, the access point interrupts a transmission layer element, such as a PHY-layer element, during the incoming message to the access point. In a third embodiment of disabling the access point's ability to send a responsive message, in cases where the access point determines that the incoming message is encrypted, the access point offloads the encrypted incoming message to another computing device.

In another aspect of the method for operating an access point, the method divides an incoming message into multiple portions. In one embodiment, the method of operating an access point examines a first portion of the message, with the effect of identifying the wireless device that sent the message, and with the effect of allowing the access point to determine whether sending a responsive message to that wireless device would be undesirable. In another embodiment, the method of operating the access point interrupts a transmission layer element of the access point in response to a second portion of the incoming message. In a further embodiment, interruption of the transmission layer element occurs during a third portion of the incoming message.

In a further aspect of the method for operating an access point, the method of operating an access point examines the incoming signal based upon an external signal that associates the access point with a set of associated wireless devices that includes at least one of the wireless devices. Based on this examination the access point is capable of suppressing a responsive message to any wireless device that is not one of the set of associated wireless devices. Preferably this external signal is sent by a control element such as a system controller that associates the access point with a set of associated wireless devices. In a first example, the system controller associates the access point with a set of associated wireless devices and sends an external signal to the access point identifying the set of associated wireless devices, with the effect that the access point is capable of suppressing responsive messages to any wireless devices that is not one of the set of associated wireless devices. In a second example, the system controller associates the access point with an updated set of associated wireless devices that is different from the set of associated wireless devices. The system controller sends an external signal notifying the access point of this updated association, with the effect that the access point is capable of suppressing a responsive message to any wireless device that is not one of the updated set of associated wireless devices. This updating method can be employed to expedite handoffs, as disclosed in the Incorporated Disclosure.

An access point associated with a communication network includes a communication transceiver that transmits outgoing messages and receives incoming messages to and from wireless devices, under the control of an access point control circuit. The access point control circuit processes the outgoing and incoming messages according to a protocol in which, in response to an incoming message from one of the wireless devices, the communication transceiver sends a responsive message to that wireless device. The access point includes a memory with information identifying at least one of the wireless devices, this information being obtained from an external control signal, such as a message packet. In response to this information, the access point control circuit suppresses the responsive message to the wireless device. Preferably, the responsive message to be suppressed is transmitted at the media access control (MAC) layer, such as an ACK message at the MAC layer.

The access point suppresses a responsive message to a wireless device by substantially disabling the access point's ability to send a responsive message. The access point can suppress a responsive message such as an ACK message by not generating the responsive message, or by not transmitting a generated responsive message. In a first embodiment, the access point includes a relatively powered transmitting antenna and a relatively unpowered transmitting antenna, and the access point control circuit sets radio transmissions from the access point to the relatively unpowered transmitting antenna for the duration of the responsive message to be suppressed by the access point. In a second embodiment, the access point includes a PHY-layer element that operates within the physical layer as defined by the protocol. Radio communication signals are transmitted and received, and the access point control circuit interrupts the PHY-layer element in response to the incoming message. In a third embodiment, the memory identifies authorized wireless devices for which responsive messages should be sent in response to encrypted incoming messages. In the third embodiment, when the access point control circuit determines that an incoming message is encrypted, and that the wireless device that sent the incoming message is not an authorized wireless device, the access point offloads that encrypted incoming message to another computing device.

In a preferred embodiment of the access point, the communication network includes a system controller external to the access point, and memory of the access point includes information received from the system controller. This might occur, as described above, in wireless communication systems with a system controller that assigns wireless stations to specific access points. For example, the system controller can associate the access point with an associated wireless device and communicate this information to the access point for inclusion in the memory. In response to this information, the access point control circuit suppresses responsive messages to any wireless device except the associated wireless device.

An apparatus according to a further embodiment of the invention includes a communication transceiver, a control circuit that processes incoming and outgoing signals of the communication transceiver, and a clock. The control circuit operates according to a protocol in which in response to an incoming message from one or more wireless devices the control circuit causes the communication transceiver to send a responsive message to said one or more wireless devices. In response to the clock and based upon an examination of the incoming message to identify the one or more wireless devices, the control circuit suppresses the responsive message for at least one of the wireless devices.

In one application of this further embodiment, the apparatus includes a first access point within a communication network that includes a plurality of access points. In addition to the clock of the first access point, substantially every other aspect point includes an internal clock, and these clocks are substantially synchronized with each other. The aspect points of the communication network can suppress responsive messages in a synchronized arrangement.

In another application of this further embodiment, the control circuit divides the incoming message into multiple portions, including a fixed portion having a predetermined duration as determined by the clock. The control circuit examines the fixed portion of the incoming message to determine whether to suppress the responsive message. One or more other portion of the incoming message may also have a predetermined duration as determined by the clock, and the control circuit may also examine the one or more other portion of the incoming message to determine whether to suppress the responsive message.

DETAILED DESCRIPTION

Generality of Invention

Figure 1:
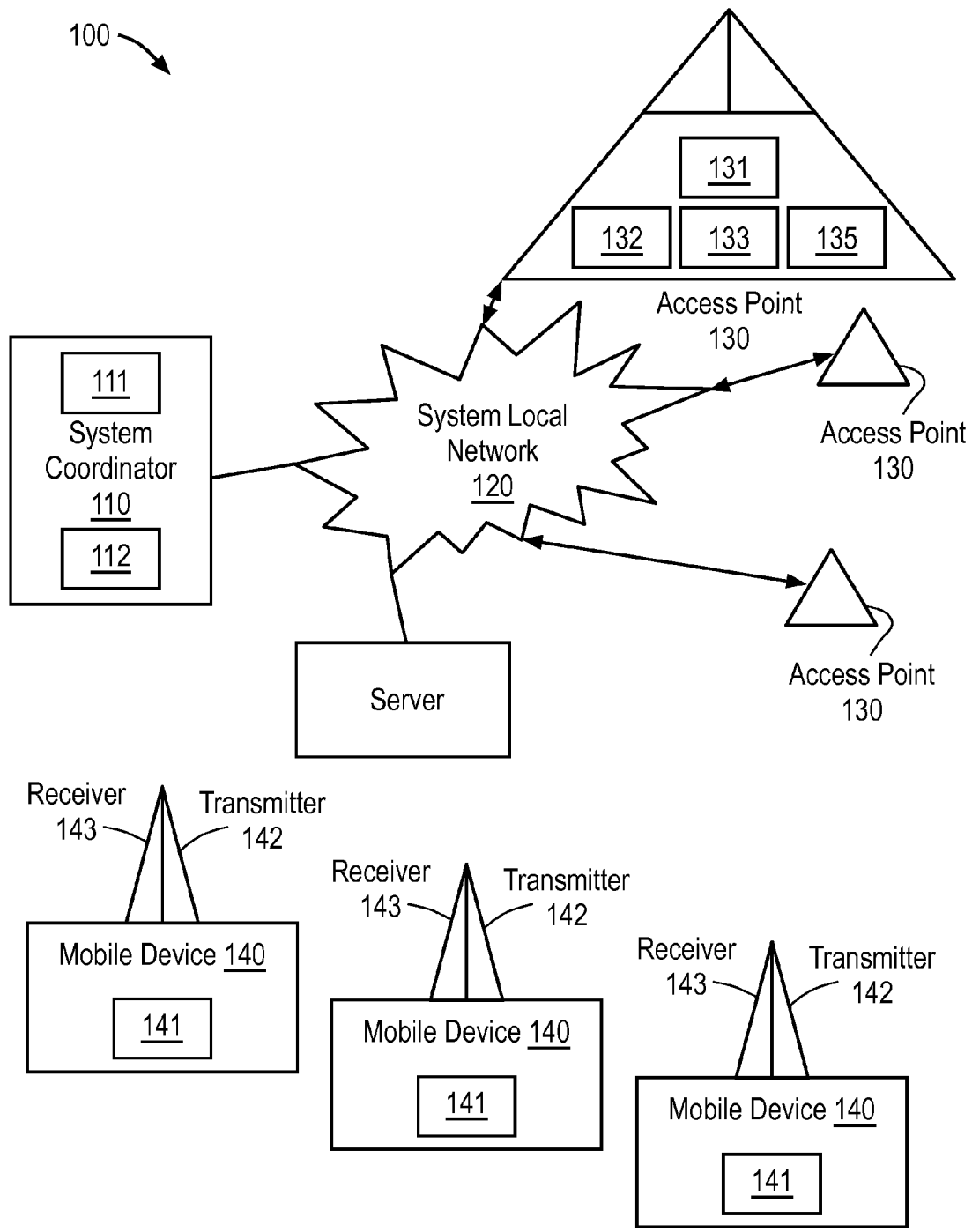
FIG. 1 shows a block diagram of a wireless communication system including access points and wireless devices.

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

DEFINITIONS

The phrase "access point", the term "AP", and the like, generally refer to devices capable of wireless communication with wireless devices and capable of either wired or wireless communication with other devices. In preferred embodiments, AP's communicate with external devices using a L2/L3 network. However, in the context of the invention, there is no particular requirement that AP's have an actual wired communication link; AP's might communicate entirely wirelessly.

The term "ACK", and the phrases "ACK message" and "responsive message" and the like, generally refer to an acknowledgement message in accordance with a wireless communication standard such as IEEE 802.11a, 11b, 11g, or 11n. In the context of the invention, the phrase "responsive message" also can refer to other types of message besides an ACK message, in which the responsive message is at the media access control (MAC) layer of the OSI network model and is transmitted to a wireless device by an AP in response to an incoming message from the wireless device. In preferred embodiments, the responsive message is an ACK frame 14 bytes long.

The phrases "incoming message" and "received frame" generally refer to a message packet or message frame sent by a wireless device or wireless station to an AP. In the preferred embodiment these phrases refer to a frame sent by a wireless station to an AP under 802.11 wireless communication standards. The incoming message may be a unicast frame (intended for a single AP) or a multicast frame (intended for multiple AP's).

The phrases "L2/L3 network", "communication network", and the like, generally refer to a communication network in which data packets are transmitted substantially in accordance with the ISO/OSI model or a similar model. In preferred embodiments, an L2 network includes a LAN, such as an Ethernet-type LAN, while an L3 network includes a packet-switched network, such as multiple LAN's coupled using bridges or routers. However, in the context of the invention, where an L2/L3 network or communication network is described there is no particular requirement for any particular type of network, whether designated as an L2/L3 network or otherwise.

The phrase "PHY-layer element" generally refers to an element of an access point or other device that operates at the physical layer of the OSI network model. A PHY-layer element connects a data link layer element (sometimes called a MAC-layer element herein) to a physical medium. In the preferred embodiment of the present invention, a PHY-layer element includes one or more components of a wireless LAN chip in which radio communication signals are transmitted and received.

The phrase "transmission layer element" generally refers to an element of an access point or other device that operates at one of the layers of the OSI network model.

The phrase "wireless communication" and the like, generally refers to radio frequency or other electromagnetic communication. In preferred embodiments, wireless communication includes a wireless communication standard such as IEEE 802.11a, 11b, 11g, or 11n. However, in the context of the invention, there is no particular requirement that wireless communication or a communication network must necessarily (1) use radio spectrum, (2) use electromagnetic communication, or even (3) be entirely confined to untethered communication coupling.

The phrases "wireless device", "wireless station", and the like, generally refer to devices capable of wireless communication with AP's. In preferred embodiments, wireless devices implement a wireless communication standard such as IEEE 802.11a, 11b, 11g, or 11n. However, in the context of the invention, there is no particular requirement (1) that this particular communication standard is used, e.g., the wireless communication might be conducted according to a standard other than 802.11, or even according to a an IEEE standard entirely, or (2) that all wireless devices each use the same standard or even use inter-compatible communication standards.

System Elements

FIG. 1 shows a system block diagram of a wireless communication system. As also shown in the Incorporated Disclosure, U.S. application Ser. No. 11/715,287, a wireless communication system 100 includes at least those elements shown in the Figure, including a system controller 110, a system local network 120, a set of access points 130, and a set of wireless stations or wireless devices 140 (each of which may or may not be mobile).

The system coordinator 110 includes elements shown in the figure, including at least a coordinator circuit 111 and a coordinator memory 112. The coordinator circuit 111 includes a computing device, such as a processor, program and data memory, and optionally mass storage. In cases in which the coordinator circuit 111 includes a programmable computing device, it also operates under control of software, optionally distinguished as operating system software and application software.

The coordinator memory 112 includes information relating to the status of the system 100, its AP's 130, and its wireless devices 140. This information preferably includes global state information about the AP's, the wireless devices, and the overall system. This information can be collected from the AP's and from the wireless devices through the AP's. The global state information can include, for example, which AP's are communicating with which wireless devices and parameters for those communications. Examples of such parameters can include, but are not limited to, identifiers and other data used by the AP's and wireless devices, signal strength and/or noise level information, and parameters such as data rate for the communications. The system coordinator can make decisions based on global state information, for example instructing AP's about what identifiers and other communication parameters to use. The coordinator circuit 111 operates with the coordinator memory 112 to perform such functions.

The system local network 120 includes any technique for sending and receiving information between the system coordinator 110 and the AP's 130. In a first set of preferred embodiments, the system local network 120 includes an L2/L3 network, capable of substantially reliably communicating data packets between the system coordinator 110 and the AP's 130. However, in the context of the invention, there is no particular requirement for using this technique.

Wireless Devices

Each wireless device (or wireless station) 140 includes elements shown in the figure, including at least a device control circuit 141, a transmitter 142, and a receiver 143. In a first set of preferred embodiments, the device control circuit 141 includes a computing device preprogrammed to implement one or more of the IEEE 802.11a, 11b, 11g, or 11n protocols, and includes one or multiple radios. One example of a wireless device could be a telephone or mobile computer preprogrammed to operate in a wireless environment. However, in the context of the invention, there is no particular requirement that the device control circuit 141 must be preprogrammed; it may instead include programmable memory, data memory, and optionally mass storage. One example of this distinct type of wireless device could be a mobile computer programmable to discover its wireless environment and operate therein.

Wireless devices make decisions regarding their communication based on local information, for example information about what AP's a wireless device can "hear," information about a communication link and possible communication links sent by AP's to the wireless device, and the like. Wireless devices can choose an AP with which to communicate based on this information.

A message sent by a wireless device 140 to an AP 130 is herein generally called an "incoming message" or "received frame", reflecting the perspective of the receiving AP. Preferably an incoming message includes a frame sent by a wireless station 140 to an AP 130 under 802.11 wireless communication standards.

Access Points

Each access point (AP) 130 includes elements shown in FIG. 1, including at least an AP control circuit 131, an AP control memory 132, a transmit multiplexer 133, and a receive de-multiplexer 135. (Additional elements of a preferred embodiment of access point 130 are discussed below with reference to FIG. 2). The AP control circuit 131 includes a computing device, such as a processor, program and data memory, and optionally mass storage. In cases in which the AP control circuit 131 includes a programmable computing device, it also operates under control of software, optionally distinguished as operating system software and application software.

The AP control memory 132 (sometimes referred to herein as the memory of AP 130) includes information relating to the status of the system 100, the particular AP 130, and those wireless devices 140 assigned to that AP 130. The AP control circuit 131 operates with the AP control memory 132 to perform functions described below. In the method and apparatus of the invention, AP control memory 132 can include information used by AP control circuit 132 to decide when to suppress ACK messages in response to incoming messages from wireless devices 140.

The AP control circuit 131 determines which signals it desires to send and on what frequencies, and sends that information to the transmit multiplexer 133. The transmit multiplexer 133 causes those signals to be multiplexed onto those frequencies using one or more radios. The receive de-multiplexer 135 causes the multiplexed signals to be separated into their frequency-modulated information components, and couples those information components to the AP control circuit 131.

Figure 2:
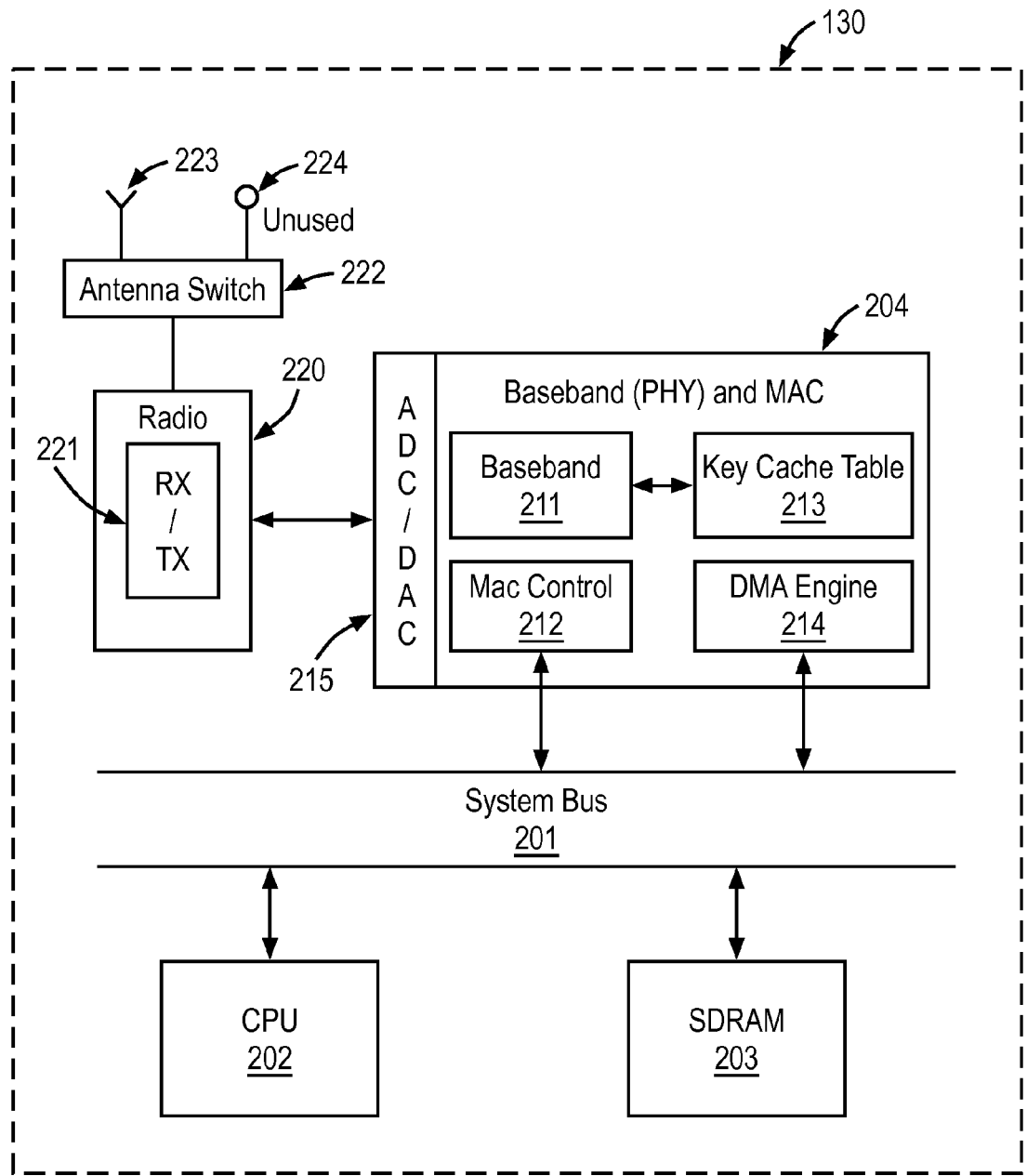
FIG. 2 shows a system block diagram of an access point.

Additional details of one embodiment of an access point 130 are shown in the system block diagram of FIG. 2. An access point 130 includes at least those elements shown in the figure, including at least a system bus 201, and coupled to the system bus, a computing element 202, a memory 203, and an access point chipset 204. The access point chipset includes at least those elements shown in the figure, including a PHY-layer element 211 (shown as baseband (PHY) control element 211), a MAC-layer element (control element) 212, a key cache table 213, a memory access element 214, and an analog/digital converter 215. The analog/digital converter is coupled to a radio 220, which includes at least those elements shown in the figure, including a receiver/transmitter 221, an antenna switch 222, an active antenna 223, and an inactive antenna 224 (marked "unused").

The access point chipset 204 provides functionality for frame transmission and reception over the wireless medium, including reception of incoming messages and transmission of ACK messages. In one embodiment, the access point chipset includes an Atheros client chipset supplied by Atheros Communications of Santa Clara, Calif.

The PHY-layer element (baseband control element) 211 operates at the physical transmission layer of the OSI network model and is the component of chipset 204 in which radio communication signals are transmitted and received via analog/digital converter 215. MAC-layer element 212 provides addressing and channel access control mechanisms that make it possible for several terminals or network nodes to communicate within a multipoint network, and that emulate a full-duplex logical communication channel. The MAC layer addressing mechanism is called a BSSID, which is the unique MAC address of a wireless station (STA) in an access point in the Basic Service Set (BSS) under 802.11 protocols.

Under the methods of the Incorporated Disclosure, a collection of AP's 130 appear to a wireless device 140 as if they collectively form a single cell (or "virtual cell") for communication. All access points in a virtual cell have the same BSSID, i.e. they act as if there is only a single AP. Wireless stations 140 are assigned by the system coordinator 110 to particular access points, and an incoming message sent by a wireless device 140 would normally be a unicast frame (intended for a single AP). However, a unicast 802.11 protocol frame can be heard by neighboring AP's, which can include more than one such AP. In response to the 802.11 protocol, those AP's that hear the unicast frame will generate an ACK response and attempt to transmit the ACK to the wireless device 140. The present invention provides techniques to prevent ACK responses to wireless device 140 from AP's 130 where such response is undesirable, e.g. responses from AP's other than the AP 130 to which wireless station 140 is assigned.

Further illustrated elements of access point chipset 204 include DMA engine 212 and key cache table 213. DMA engine 212 (or Direct Memory Access) is the mechanism within chipset 204 used to transfer contents of a received packet from the chipset to host memory, and vice versa. Key cache table 213 is a data structure used to efficiently encrypt frames. When frames are queued for transmission, the destination address of a wireless station is looked up in the key cache table and the resulting key is used to encrypt the frame. As discussed below, the invention uses key cache table 213 as one mechanism for suppressing undesired ACK responses.

Computing element or CPU 202 communicates with the access point chipset 204 and with SDRAM memory 203 over the system bus 201. In the case in which the computing element 202 includes a programmable computing device, it also operates under control of software. CPU 202 implements frame processing at the Medium Access Control level and higher levels of the OSI network model.

Because ACK generation is a time critical function it is implemented in the chipset 204. On receiving a unicast 802.11 frame AP 130 must send ACK within a time interval on the order of a few milliseconds. According to the IEEE 802.11 protocol specification, an 802.11 unicast frame must be acknowledged by its receiver after a period of SIFS (Short Interframe Space) which is equal to 10 microseconds for 802.11b and 16 microseconds for 802.11a/g/n. According to these protocols, the ACK is generated in the chipset 204 and is transmitted out of the radio 220 at the end of the SIFS interval. The invention provides various mechanisms for suppressing generated ACK messages for which transmission is undesirable, as discussed below.

Mechanisms for Suppressing ACK

The invention includes various mechanisms for suppressing the trans-mission of ACK messages or other responsive messages. The following mechanisms may prevent the generation of an ACK, or may prevent the transmission of a generated ACK that can be heard by a wireless station.

1. For received frames (incoming messages) larger than 256 bytes in size, ACK generation is prevented by momentarily disabling the PHY-layer element 211 of the chipset 204, while the frame reception is still in progress. This interruption makes the received frame incomplete, and the chipset will not acknowledge incomplete frames according to 802.11 protocols. As described below, the CPU 202 instructs chipset 204 to disable the PHY-layer element as soon as it detects a large frame is being received. After a delay of 1 microsecond, the CPU enables the PHY-layer element again.

2. For smaller frames, ACK transmission is suppressed by instructing the chipset 204 to send the ACK to the unused antenna connector 224 (FIG. 2) just before the ACK transmission begins. Since there is no external antenna on the unused connector, any signal transmitted from it will be about 20 dB less than other transmissions and will not be heard.

3. For (preferably all) unicast encrypted frames, the chipset provides the capability to not generate an ACK message if the key cache table 213 in the chip does not have an entry for the MAC address of the wireless station 140 that sent the frame. To make use of this capability, AP 130 makes an entry in the key cache table 213 only for wireless devices 140 that are assigned to it by system coordinator 110. This capability reduces the load on CPU 202 and facilitates implementation of the various suppressing mechanisms, since it requires use of the first two mechanisms only for unencrypted frames.

Meeting the Timing Constraints for ACK Suppression

As noted above, the transfer of the data frame from the chip 204 to the CPU 202 over the bus 201 takes a time of up to several tens of microseconds, depending on the size of the frame. Normally the CPU 202 creates one memory buffer (not shown) per received frame, whose size is 2304 bytes (maximum size of an 802.11 frame). The CPU provides the memory address of the buffer to the chip, so that the chip transfers the received frame into this buffer and then generates an interrupt to the CPU. In response to this interrupt, CPU 202 reads the buffer and processes the frame. CPU 202 needs only the 802.11 header of the frame to determine the sender's MAC address (BSSID), and decide whether the ACK should be suppressed.

In a preferred technique for processing incoming messages (received frames), in order to ensure early reception of the 802.11 header of a received frame, the CPU 202 creates three independent buffers per received frame. The first buffer is 16 bytes long, second buffer is 32 bytes and the third buffer is 256 bytes.

The CPU 202 initially provides the address of only the first buffer to the chip 204. When chip 204 receives a frame, it transfers the first 16 bytes to the buffer and generates an interrupt indicating to the CPU that it has more data and the buffer is full. An interrupt handler in CPU 202 (not shown) reads the contents of first buffer and then provides the address of a second buffer to the chip. Chip 204 generates a second interrupt to CPU after the next 32 bytes are read. CPU 202 then provides an address of the third (final) buffer in which the remainder of the frame is received.

Figure 3:
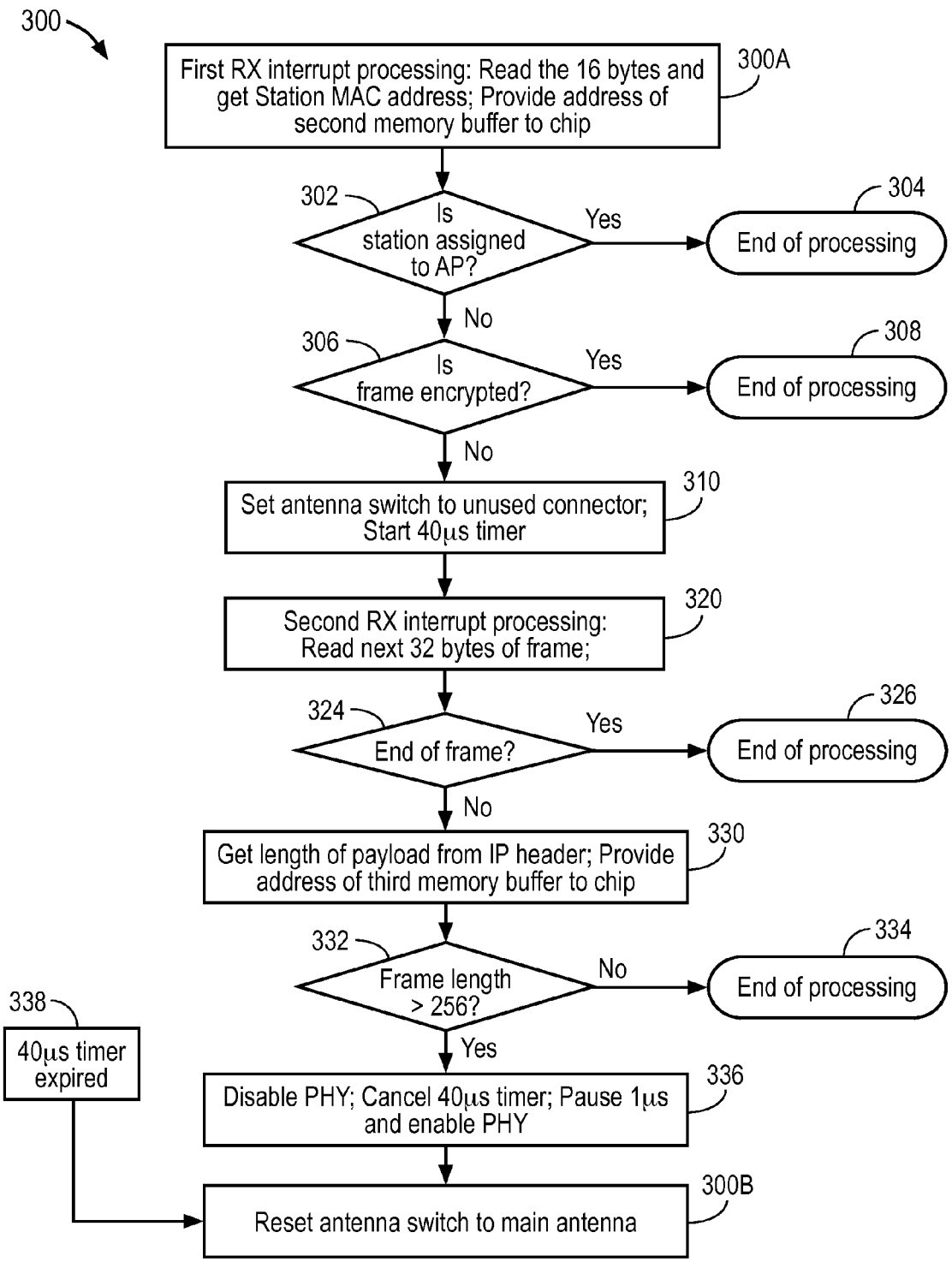
FIG. 3 shows a process flow diagram of the program sequence of an access point CPU in processing an incoming message (802.11 frame).

The process flow diagram of FIG. 3 shows the actions performed by the CPU 202 in coordination with chip 204 at different stages of processing an incoming message. Although in the preferred embodiment the method 300 is performed serially, where permitted by wireless communication protocols including the data structure of received frames the method 300 can be performed by separate elements in conjunction or in parallel, whether asynchronously, in a pipelined manner, or otherwise. There is no particular requirement that the method be performed in the same order in which this description lists the steps, except as dictated by wireless communication protocols.

The method 300 includes a set of flow labels and steps as shown in FIG. 3. Flow label 300A indicates the beginning of the method at the processing of the first interrupt from chip 204. The CPU provides the address of the second memory buffer to the chip, and reads the 16 bytes of incoming frame to acquire the wireless station's MAC address. At 302 the CPU checks if this wireless station is assigned to the AP or not. If the wireless station is assigned to the AP, the CPU ends processing at 304 whereby the AP will not suppress the ACK to that wireless station. At 306 and 308, if station is not assigned to the AP and the received frame is encrypted, the CPU ends processing and the chipset will not generate an ACK as explained at the third suppression mechanism above.

At 310 if the wireless station is not assigned to the AP and the frame is not encrypted, the CPU instructs the chip to program the antenna switch to the unused antenna connector 224 (second suppression mechanism, above) and starts a timer of period 40 microseconds.

On receiving the second interrupt at 320, the CPU gets the next 32 bytes which contain the LLC header and IP header of the frame. If this is determined to be the end of the frame at 324, processing is terminated at 326 and as explained below, setting the transmission to the unused connector at 310 ensures that the ACK will not be heard by the wireless station. If the second 32 bytes are not the end of the frame, at 330 the CPU obtains the length of the entire frame from the IP header and provides the address of the third buffer to the chip. At 332 the CPU determine whether the frame length is larger than 256 bytes, terminating processing at 324 if it is not. As explained below, for a frame that is not larger than 256 bytes setting the transmission to the unused connector at 310 ensures that the ACK will not be heard by the wireless station.

At 336 if the frame is larger than 256 bytes the CPU disables the PHY-layer element for 1 microsecond and then re-enables it, because for such large frames the first and second interrupts are generated while the frame reception is still in progress. Disabling the PHY-layer element during frame reception makes the frame incomplete and prevents ACK generation by the chip.

If the frame was smaller than 256 bytes, the chip would have fully received it by the time the first interrupt is processed and would be ready to transmit the ACK. Switching the transmission to the unused connector ensures that the ACK is not heard by the station. At 338 the timer started earlier expires, and at 300B the CPU instructs the chip to program the antenna switch back to the main antenna connector.

Clock Synchronization

In a preferred embodiment of the system, internal clocks of the AP's should be synchronized in order to facilitate proper communications. The AP's 130 monitor common wireless devices and record their packet reception times. These packet reception times, along with corresponding packet IDs, are sent to the system coordinator 110. This allows the system coordinator 110 to maintain a digest of clock offsets, and to signal back to each AP to adjust its clock offset, with the effect of synchronizing the AP clocks. One application of such synchronization is that multiple AP's can suppress ACK messages synchronously. This is useful for example in implementing the "virtual cell" technique of the Incorporated Disclosure, in which multiple AP's 130 provide an illusion to wireless devices that they are a single AP. The internal clock of an AP is also used in processing incoming messages (received frames), as discussed above with reference to FIG. 3.

Seamless Mobility Techniques of the Incorporated Disclosure

The method and apparatus of the present invention can be used to implement various techniques of the Incorporated Disclosure. In these techniques, the system coordinator 110 coordinates interactions between the AP's 130, with the effect that wireless devices 140 direct their communications to AP's chosen by the system coordinator. This is different from typical operation of the 802.11 protocol, in which the wireless devices would chose which AP's with which to communicate. Also in these techniques, multiple AP's provide an illusion to a wireless device that they are a single AP. An effect is that the need for hard handoffs between AP's is lessened, and soft handoffs may often be employed as described in the Incorporated Disclosure.

In a first set of techniques, multiple AP's share an identifier (preferably a BSSID, but other unique identifiers might be used), with the system coordinator directing one particular AP to respond to the wireless device. Since each AP uses the same BSSID to respond to the wireless device, the wireless device cannot tell which AP it is communicating with. This has the effect that the system coordinator can move the wireless device's association with an AP from a first to a second AP, both without knowledge by the wireless device and without the delay introduced by a handoff operation. This also has the effect that the collection of AP's appears to the wireless device as if they collectively form a single cell for communication, personal to that wireless device. This first approach is described at pages 14-20 of the Incorporated Disclosure, and is therein called the Personal Cell Model.

In a second set of techniques, AP's each maintain identifiers substantially unique to each wireless device (preferably BSSIDs, but other identifiers might be used), with the system coordinator directing only one particular AP to maintain any particular wireless device's identifier. This has the effect that the system coordinator can move the wireless device's association with an AP from a first to a second AP, both without knowledge by the wireless device and without the delay introduced by a handoff operation. This also has the effect that the collection of AP's appears to the wireless device as if there is only a single AP, personal to that wireless device. This second approach is described at pages 21-33 of the Incorporated Disclosure, and is therein called the Personal Access Point model.

Reference should be had to the Incorporated Disclosure for other and further details.

Alternative Embodiments

The invention has applicability and generality to other aspects of seamless mobility techniques in wireless communication, and is not limited to wireless communication based upon 802.11 standards nor is it limited to suppression of ACK messages After reading this application, those skilled in the art would recognize that the scope and spirit of the invention includes other and further embodiments beyond the specifics of those disclosed herein, and that such other and further embodiments would not require new invention or undue experimentation.

The invention claimed is:

1. A method for operating an access point, comprising
receiving an incoming message, wherein the access point operates according to a protocol in which in response to an incoming message from one of a set of wireless devices, the access point sends a responsive message to the wireless device;
receiving an external signal that identifies a set of associated wireless devices, the external signal received from a system coordinator that associates access points with wireless devices;
at the access point, examining the incoming message to identify the wireless device that sent the incoming message and the external signal to determine whether sending a responsive message to the wireless device would be undesirable by determining if the particular one wireless device has not been associated with the access point; and
suppressing a responsive message to the wireless device responsive to not being one of the set of associated wireless devices.

2. The method of claim 1, wherein the responsive message includes an ACK message transmitted at a MAC layer of a network protocol.

3. The method of claim 1, further comprising:
receiving an updated external signal from the system coordinator that updates the set of associated wireless devices; and
suppressing a responsive message to any of the one or more wireless devices that is not one of the set of updated associated wireless devices.

4. The method of claim 1, wherein examining the incoming message from the wireless device comprises examining a first portion of the incoming message.

5. The method of claim 1, wherein suppressing a responsive message further comprises:
setting a transmitting antenna from the access point to a relatively unpowered antenna for the duration of the responsive message to be sent by the access point.

6. The method of claim 1, wherein suppressing a responsive message further comprises:
interrupting a transmission layer element at a PHY-layer of a network protocol.

7. The method of claim 1, further comprising:
determining that the incoming message to the access point includes at least some encrypted information; and
in response, sending that encrypted incoming message to another computing device.

8. The access point of claim 1, further comprising:
not suppressing a responsive message to the wireless device responsive to the wireless device being one of the set of associated wireless devices.

9. An access point associated with a communication network, comprising:
a communication transceiver in communication with wireless devices and operable to receive an incoming message, wherein the access point operates according to a protocol in which in response to an incoming message from one of a set of wireless devices, the access point sends a responsive message to the wireless device, wherein the communication transceiver is also operable to receive an external signal that identifies a set of associated wireless devices, the external signal received from a system coordinator that associates access points with wireless devices; and a control circuit capable of processing outgoing messages and incoming messages, wherein the control circuit operates according to a protocol in which in response to an incoming message from one of those wireless devices, the communication transceiver sends a responsive message to the wireless device, and the control circuit is operable to examine the incoming message to identify the wireless device that sent the incoming message and the external signal to determine whether sending a responsive message to the wireless device would be undesirable by determining if the wireless device sending the message has not been associated with that access point, wherein the control circuit suppresses a responsive message to the wireless device responsive not being one of the set of associated wireless devices.

10. The access point of claim 9, wherein the responsive message comprises an ACK message which is transmitted at the MAC layer.

11. The access point of claim 9, comprising:

a relatively powered transmitting antenna and a relatively unpowered transmitting antenna, wherein the control circuit sets radio transmissions to the relatively unpowered transmitting antenna for the duration of the responsive message to be suppressed by the access point.

12. The access point of claim 9, comprising:

a PHY-layer element defined by the protocol, in which radio communication signals are transmitted and received, and wherein the control circuit interrupts the PHY-layer element in response to the incoming message.

13. The access point of claim 9, further comprising:

a memory operable to store identified authorized wireless devices for which responsive messages should be sent in response to encrypted incoming messages, wherein the control circuit in response to determining that the incoming message is encrypted and that the wireless device that sent the incoming message is not an authorized wireless device, sends the encrypted incoming message to another computing device.

14. An access point comprising:

a communication transceiver operable to receive an incoming message, wherein the access point operates according to a protocol in which in response to an incoming message from one of a set of wireless devices, the access point sends a responsive message to the wireless device;

a control circuit capable of processing incoming and outgoing signals of the communication transceiver; and a clock that is substantially synchronized with internal clocks of a plurality other access points on the network, wherein the access point is within a communication network that comprises the plurality of other access points, wherein in response to the clock and based upon an examination of the incoming message to identify the one or more wireless devices, the control circuit suppresses the responsive message for at least one of the one or more wireless devices in a manner that is substantially synchronized with the suppression of other responsive messages to the one or more wireless devices by other access points.

15. The access point of claim 14, wherein:

the control circuit divides the incoming message into multiple portions, including a first portion having a predetermined duration determined by the clock, wherein the control circuit examines the first portion of the incoming message and in response thereto determines whether to suppress the responsive message.

16. The access point of claim 14, wherein suppressing comprises:

in response to the clock and based upon an examination of whether the incoming message from one or more wireless devices has not been associated with the access point by an external signal sent from a central coordinator, the control circuit suppresses the responsive message for at least one of the one or more wireless devices.

17. At least one non-transitory computer readable storage medium storing a computer product that, when executed by a processor, performs a method for operating an access point, the method comprising:

receiving an incoming message, wherein the access point operates according to a protocol in which in response to an incoming message from one of a set of wireless devices, that access point sends a responsive message to the wireless device;

receiving an external signal that identifies a set of associated wireless devices, the external signal received from a system coordinator that associates access points with wireless devices;

at the access point, examining the incoming message to identify the wireless device that sent the incoming message and the external signal to determine whether sending a responsive message to the wireless device would be undesirable by determining if the particular one wireless device has not been associated with the access point; and suppressing a responsive message to the wireless device responsive to not being one of the set of associated wireless devices.

* * * * *